(12) United States Patent
Geiler et al.

(10) Patent No.: US 6,370,439 B1
(45) Date of Patent: Apr. 9, 2002

(54) APPARATUS FOR THE MONITORING OF A PROTECTION REGION

(75) Inventors: Martin Geiler, Gutach; Franz Dold, Furtwangen, both of (DE)

(73) Assignee: Sick AG (DE)

( * ) Notice: Subject to any disclaimer, the term of this patent is extended or adjusted under 35 U.S.C. 154(b) by 0 days.

(21) Appl. No.: 09/261,889

(22) Filed: Mar. 3, 1999

(30) Foreign Application Priority Data

Mar. 6, 1998 (DE) ......................................... 198 09 709

(51) Int. Cl.⁷ .............................................. G05B 15/00
(52) U.S. Cl. ...................... 700/83; 250/221; 340/550; 340/555
(58) Field of Search ............................... 700/1, 12, 17, 700/264, 13, 21, 79, 83; 250/208.4, 221, DIG. 1; 340/550, 555, 556; 361/170, 173, 175–177, 179–181; 200/334; 414/273; 307/139, 326

(56) References Cited

U.S. PATENT DOCUMENTS

| 4,283,612 A | * | 8/1981 | Richards ..................... 200/334 |
| 4,840,248 A | * | 6/1989 | Siverman ................ 250/221 X |
| 5,141,381 A | * | 8/1992 | Kato et al. .................. 414/273 |
| 5,563,580 A | | 10/1996 | Stephens .................... 340/541 |
| 5,705,906 A | * | 1/1998 | Tanabe et al. .......... 700/264 X |

FOREIGN PATENT DOCUMENTS

| DE | 3838873 A1 | 5/1990 |
| DE | 29606381 U1 | 8/1996 |
| EP | 0567717 A1 | 11/1993 |
| FR | 2733849 | 11/1996 |
| GB | 2099536 A | 12/1982 |

* cited by examiner

Primary Examiner—William Grant
Assistant Examiner—Steven R. Garland
(74) Attorney, Agent, or Firm—Brian N. Young; Townsend and Townsend and Crew LLP

(57) ABSTRACT

An apparatus for the monitoring of a protection region which comprises a monitoring unit for the detection of an object penetrating into the protection region is described. The monitoring unit has at least one output at which a control signal for the excitation of a device to be monitored, in particular a switching signal for the switching off of the device, can be produced when an object penetrates into the protection region. Furthermore, the apparatus comprises at least one connection for a switch, in particular for an emergency off switch, through which the device can be excited, in particular switched off. The connection is designed as input of the monitoring unit, with it being possible to generate the control signal for the device to be monitored at the output of the monitoring unit through actuation of a switch which is connected to the input.

18 Claims, 2 Drawing Sheets

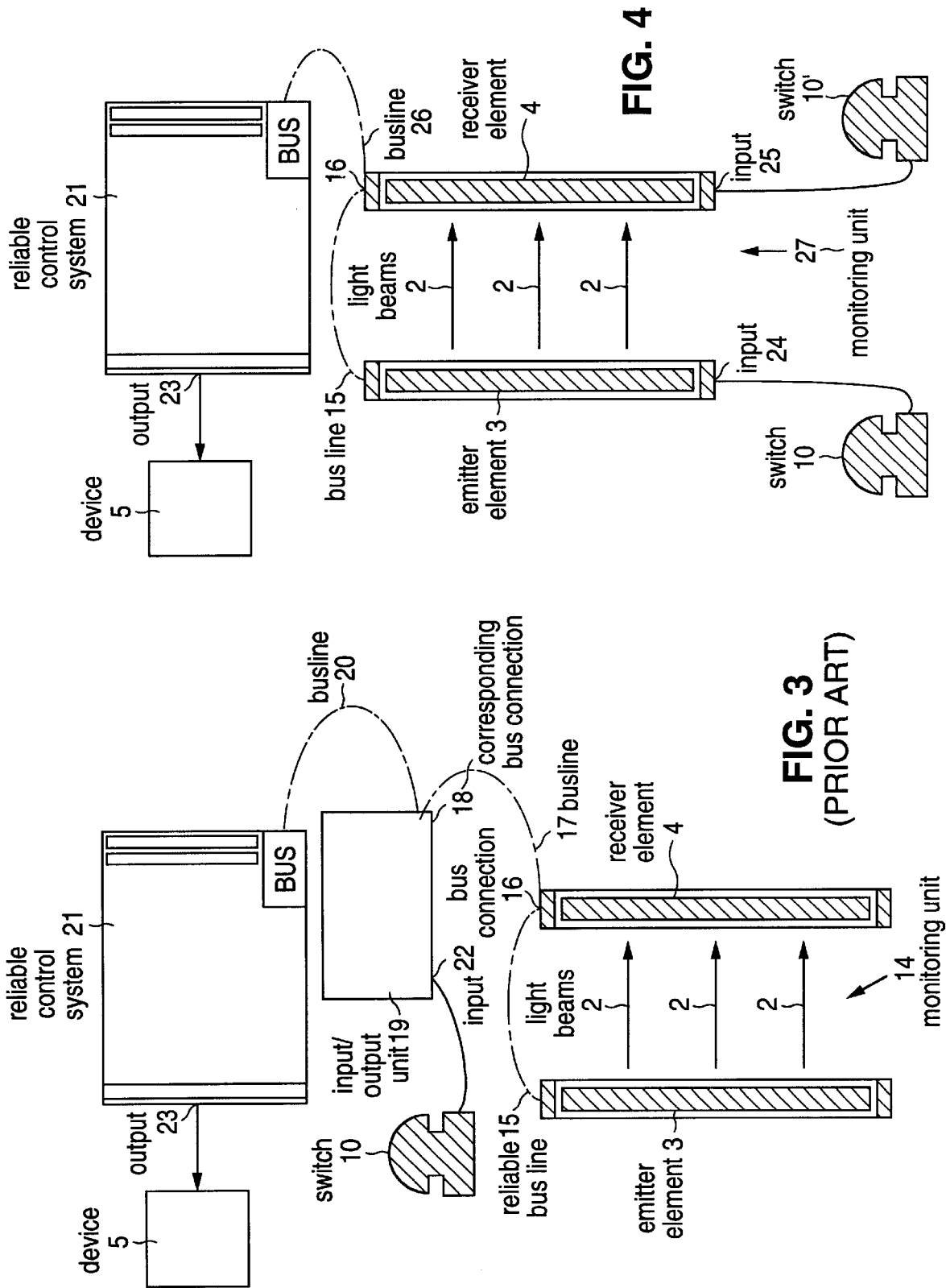

APPARATUS FOR THE MONITORING OF A PROTECTION REGION

BACKGROUND OF THE INVENTION

1. Field of the Invention

The present invention relates to an apparatus for the monitoring of a protection region comprising a monitoring unit for the detection of an object penetrating into the protection region, with the monitoring unit having at least one output at which a control signal for the excitation of a device to be monitored, in particular a switching signal for the switching off of the device, can be produced when an object penetrates into the protection region, and comprising at least one connection for a switch, in particular for an emergency off switch, through which the device can be excited, in particular switched off.

2. Description of the Prior Art

Protection regions of dangerous machines are usually made secure with apparatuses of this kind. Among these are for example pressing, cutting and planing machines as well as other machines in which automated movement sequences of parts of the machine are present within the protection region.

In order also to enable a manual switching off, for example via an emergency off switch, in apparatuses of this kind in addition to the switching off of the monitored device through the generation of a corresponding switch-off signal by the monitoring unit, for example the switching output of the monitoring unit and the output of the emergency off switch are led to a common switching element, through which both the signals which come from the emergency off switch and the signals coming from the switching output of the monitoring unit are checked. As soon as one of the two signals is recognized by the switching unit as a switching signal, a corresponding switch-off signal is generated at the output of the switching unit and is transmitted to the apparatus to be monitored, so that the latter is switched off.

Disadvantageous in this is that the switching element must satisfy specific safety requirements depending on the field of use and therefore usually has a non-negligible share of the costs in the total costs of a corresponding monitoring apparatus. Moreover, through the additional insertion of a switching element into the switch-off path there is the danger that the individual elements are connected together in an incorrect manner, through which the capability of functioning of the apparatus would not be ensured. Precisely this must be excluded however in the initially named safety-relevant monitoring apparatuses.

Since the switching unit is usually arranged at a relatively large distance from the device to be monitored, but the emergency off switch must however be provided near the potential danger location, i.e. in the region of the device to be monitored, the connection line between the emergency off switch and the switching unit often has a relatively great length. This is disadvantageous since the costs for the line, which must correspond to the prescribed safety requirements, are thereby increased and moreover the danger of a damage to the line increases.

SUMMARY OF THE INVENTION

The object of the invention is to provide an apparatus of the initially named kind which is simple and economical to manufacture and in which a faulty switching of the individual components is practically excluded.

Starting from an apparatus of the initially named kind this object is satisfied in accordance with the invention in that the connection is designed as input of the monitoring unit and in that through actuation of a switch which is connected to the input the control signal for the device to be monitored can be generated at the output of the monitoring unit.

Thus in accordance with the invention the function inherent in the monitoring unit is also used during the actuation of a switch which is connected to the input of the monitoring unit, for example an emergency off switch, to generate a corresponding control signal for the excitation of the device to be monitored. In this way an additional, reliable switching unit for the sampling of the output signals of the monitoring unit and of the emergency off switch can be dispensed with, since the control signal which is present at the output of the monitoring unit is generated by the same section of the monitoring unit both during the detection of an object which penetrates into the protection region and through actuation of the emergency off switch.

Furthermore, a faulty connection of the individual components is practically excluded in the apparatus which is designed in accordance with the invention since the monitoring unit is connected up in the usual way and the emergency off switch needs merely be connected up to a correspondingly designated input of the monitoring unit.

Since the monitoring unit is naturally arranged in the immediate vicinity of the device to be monitored and also the emergency off switch, as initially mentioned, must be provided close to this device, the connection line between the emergency off switch and the monitoring unit can be kept relatively short with an apparatus in accordance with the invention. Thus, on the one hand, the costs for the monitoring line can be reduced and, on the other hand, the danger of a damaging of the line can be reduced.

If the terms "emergency off switch" and "switch off" are predominantly used in this application, then this is meant merely by way of example. The idea of the invention is however not restricted to this embodiment, but rather also comprises the cases in which for example a control signal is generated instead of a switch-off signal through which the device can be correspondingly excited. For example the speed of rotation of a monitored machine can be merely reduced or other control processes, such as the closing or opening of a door, can be triggered by the control signal. In the emergency off switch it can also be a matter of a continuously switching switch, so that here not only the switch states "on/off" but rather continuous switching states can be possible.

In accordance with an advantageous embodiment of the invention the monitoring unit has a large number of inputs at which a large number of switches can be connected up. The invention is thus not restricted to the use of a single switch, but rather a plurality of switches can be provided, which for example are provided at different locations for the generation of the switching signal.

The monitoring unit is preferably designed as a contactlessly acting monitoring unit, in particular as a light grille. Contactlessly acting monitoring units are particularly advantageous since as a rule they operate without maintenance and are not mechanically stressed during the penetration of an object into the monitoring region, through which the probability of a defect can be reduced. In principle it is however also possible to design the monitoring unit as a mechanically responding monitoring unit, in particular with a tread mat for the detection of objects penetrating into the monitoring region or in another suitable manner.

In accordance with a further advantageous embodiment of the invention the monitoring unit comprises an emitter element for the emission of an emitter signal and a receiver element which is designed for the reception of the emitter signal which is emitted by the emitter element, with the output at which the switching signal is generated being provided at the receiver element. In this the connection is preferably designed as input of the receiver element.

Through the design of the connection as input of the receiver element a particularly simple embodiment of the apparatus in accordance with the invention is possible, since in this manner all connections are provided at the receiver element (input for the switch as well as output to the switching signal generation). A separate connection between the emitter element and the receiver element is not required in this embodiment.

In accordance with a further embodiment of the invention it is however alternatively or additionally possible that the connection is designed as input of the emitter element and that the emitter element is coupled to the receiver element for the transmission of control signals, in particular via a bus line. This design is in particular advantageous when the electric input signals are already occupied in the receiver element by other functions, such as for example protection check, command device, lamp outputs, switching outputs and so on. In contrast to this, the corresponding signal inputs at the emitter element to which the switch can be connected are often unused and/or available.

In accordance with a further advantageous embodiment of the invention the output is connected via a bus line to a reliable control system with a bus connection, via which the device to be monitored can be excited. This embodiment is useful in particular when the emitter element is connected to the receiver element via a bus line so that the switch can be connected up at an input of the emitter element. In principle however this embodiment is also possible when the switch is connected at an input of the receiver element or when a switch is connected at the receiver element and a switch is also connected at the emitter element.

In accordance with a further preferred embodiment of the invention the connection is designed as a multiple function connection, for example for the connection of a restart key, a clocked control system, an operating mode selection switch, a memorizing switch or for operation as a switching or report output or as synchronization connection for a plurality of monitoring units which are connected together. Through the use of multiple function connections a very variable use of an apparatus which is designed in accordance with the invention is possible. The multiple function connections can be switched and used both as input and also as output through corresponding configuration of the monitoring unit so that depending on the requirements an emergency off switch can in accordance with the invention be connected at one or more of the multiple function connections. Through this the reliability of a corresponding apparatus can be further increased.

BRIEF DESCRIPTION OF THE DRAWINGS

FIG. 3 illustrates a further monitoring apparatus in accordance with the prior art, and FIG. 4 illustrates a further embodiment of a monitoring apparatus which is designed in accordance with the invention.

DETAILED DESCRIPTION OF SPECIFIC EXEMPLARY EMBODIMENTS

Figure 1:
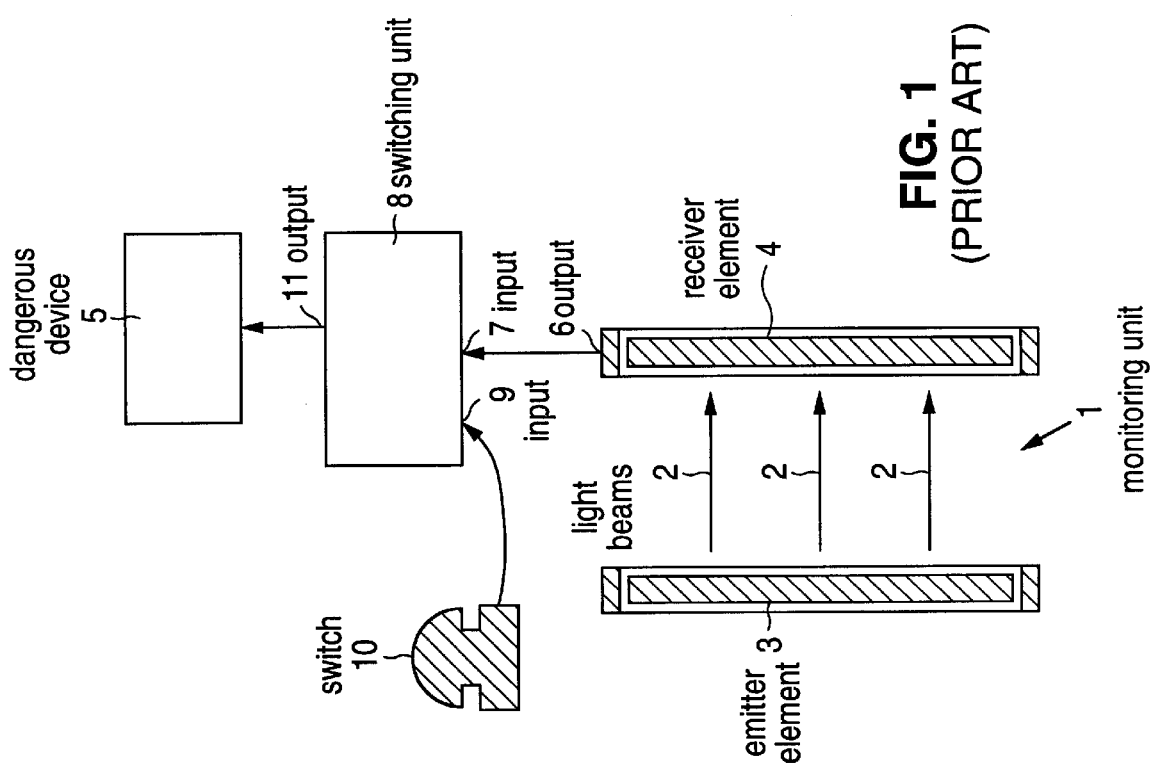
FIG. 1 illustrates a monitoring apparatus in accordance with the prior art.

FIG. 1 shows a contactlessly acting monitoring unit 1 which is designed as a light grille and which comprises an emitter element 3 which emits light beams 2 and a receiver element 4 which receives the light beams 2. In this the monitoring unit 1 is for example arranged in such a manner that for example a dangerous device 5 which is arranged within a protection region can be reached only by interrupting the light beams 2.

The receiver element 4 has an output 6 which is connected to the input 7 of a reliable switching unit 8. In this the switching unit 8 can for example be designed in relay technology or as a purely electronic unit.

The switching unit 8 has a further input 9 at which a switch 10 is connected and an output 11 via which the unit 8 is connected to the device to be monitored 5.

The method of operation of this apparatus is as follows:

If an object penetrates into the protection region of the monitoring unit 1 then at least one of the light beams 2 is interrupted, through which the receiver element 4 generates a corresponding control signal, for example in the form of a switch-off signal for the device 5, at the output 6. This control signal is transmitted via the input 7 to the reliable switching unit 8, which transmits the corresponding switching signal via its output 11 to the device 5. In this way the device 5 is for example switched off.

In addition to the switching off when an object is detected within the protection region the device 5 can also be switched off in that the switch 10 is actuated, which is recognized by the reliable switching unit via the input 9. In this case the switching unit 8 generates a control or switch-off signal respectively for the device 5 which corresponds to the control or switch-off signal respectively which is transmitted from the receiver element 4 to the device 5 when the light beams 2 are interrupted and transmits this signal in turn via its output 11 to the device 5. Thus the device 5 is also for example switched off thereby in this case.

Figure 2:
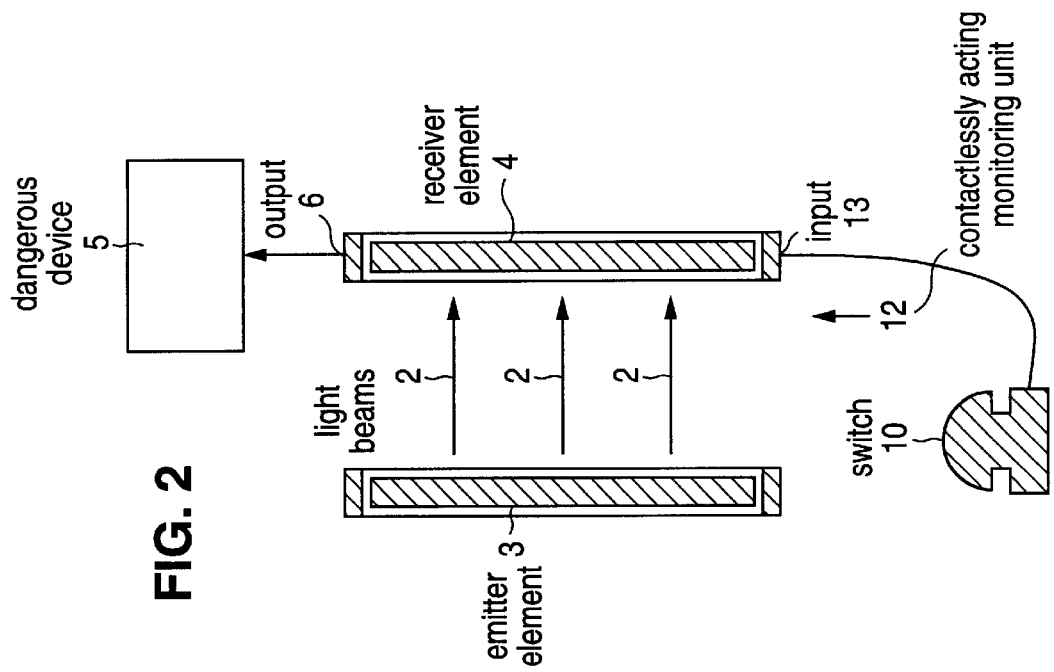
FIG. 2 illustrates a first embodiment of a monitoring apparatus which is designed in accordance with the invention.

In the embodiment illustrated in FIG. 2, elements which are already known from FIG. 1 are provided with the same reference symbols.

FIG. 2 shows a contactlessly acting monitoring unit 12 which is designed in accordance with the invention and which is designed as a light grille and comprises, as does the monitoring unit 1 in accordance with FIG. 1, an emitter element 3 for the emission of light beams 2 and a receiver element 4 for the reception of the emitted light beams 2.

The receiver element 4 has a connection which is designed as input 13 and at which a switch 10 which is provided analogously to FIG. 1 is connected.

The output 6 of the receiver element 4 is connected directly to the device to be monitored 5 so that the switching unit 8 which is provided in FIG. 1 is not present.

The apparatus in accordance with the invention which is illustrated in FIG. 2 operates as follows:

If at least one of the light beams 2 is interrupted by an object which penetrates into the protection region of the monitoring unit 12, then a corresponding control or switch-off signal respectively for the device 5 is generated by the receiver element 4 at the output 6 and transmitted to the latter. The device 5 is in this case for example switched off.

If the switch 10 is actuated, then a corresponding signal is transmitted via the input 13 to the receiver element 4, whereupon the same switching function is triggered in the latter as is the case during an interruption of one of the light beams 2. Thus in this case the function inherent in the receiver element 4 of generating a control or switch-off signal respectively is also exploited during the actuation of the switch 10 so that when the switch 10 is actuated the same control or switch-off signal respectively is generated at the output 6 of the receiver element 4 as is the case in an interruption of a light beam 2.

This control or switch-off signal respectively is transmitted in the usual way to the device 5 so that the latter is for example switched off.

The apparatus in accordance with the invention in accordance with FIG. 2 can thus be constructed significantly more simply than the apparatus in accordance with FIG. 1 since it is not necessary to provide a reliable switching unit 8 which must, on the one hand, check the two inputs 7 and 9 for the presence of a switching signal and, on the other hand, generate a control or switch-off signal respectively for the device 5 which is in conformance with the output signal of the receiver element 4 when the switch 10 is actuated.

If the input 13 is designed as a multiple function connection, then this connection can be configured for different functions. For example the following functions can be provided instead of the connection of a switch 10: connection of a command device, use as reliable switching output, for example for the linking of a plurality of monitoring units, use of report outputs, for example for the excitation of acoustical or optical signal generators, connection for clocked control systems of machines, connection of operation mode selection switches for the selection of switching functions such as for example blanking switchover, one cycle, two cycle, restart blocking, on/off, connection of a restart key or a memorization key or use as a synchronization connection for a plurality of monitoring units which are connected together. With the memorization key the monitoring unit can for example be switched over into a learning mode in which e.g. the shape of worked articles which protrude out of a press and into the protection region is memorized. The protected field which is memorized in this manner can then be stored in the monitoring unit and be used after a switching back of the monitoring unit via the memorization key into the monitoring mode.

If a plurality of connections 13 are provided at the receiver element 4, then one or more of the indicated functions can be provided, in particular in addition to a connection of a switch 10. Furthermore, it is also possible to provide a plurality of switches 10, so that the device 5 can for example be switched off from a plurality of different locations.

FIG. 3 shows a monitoring unit 14 in accordance with the prior art in which the emitter element 3 and the receiver element 4 are connected to one another via a reliable bus line 15.

In this the receiver element 4 has a bus connection 16 which is connected both to the bus line 15 and to a further bus line 17. The bus line 17 is in turn connected to a corresponding bus connection 18 of a reliable, bus-capable input/output unit 19, which is in turn connected via a further bus line 20 to a reliable control system 21 with a bus connection.

The reliable bus-capable input/output unit 19 has an input 22 at which the switch 10 is connected.

The reliable control system 21 has an output 23, via which it is connected to the device to be monitored 5.

The switching off or the excitation respectively of the device to be monitored when an object penetrates into the monitoring region or when the switch 10 is actuated takes place analogously to the method of functioning described with reference to FIG. 1.

If one of the light beams 2 is interrupted, then a corresponding control or switch-off signal respectively is generated by the receiver element 4 at the output 16 and is transmitted via the bus lines 17 and 20 to the reliable control system 21 and from there via the output 22 to the device to be monitored 5. In this way the device 5 is for example switched off.

If the switch 10 is actuated, then a corresponding signal is generated at the input 22 of the reliable bus-capable input/output unit 19 and is evaluated by the latter. As a result of this signal a control or switch-off signal respectively is generated by the reliable bus-capable input/output unit 19 such as is generated by the receiver element 4 when the light beams 2 are interrupted. This control or switch-off signal respectively is transmitted via the bus line 20 to the reliable control system 21 and ultimately leads via the output 23 to the switching off of the device 5.

Thus also in this case a separate, reliable bus-capable input/output unit is in turn required which checks the input 22 and generates a control or switch-off signal respectively which is suitable for the reliable control system 21 when a switching signal is present at the input 22.

In the embodiment in accordance with the invention shown in FIG. 4 the reliable bus-capable input/output unit 19 can be omitted so that this apparatus can be constructed more simply and more economically than the apparatus illustrated in FIG. 3.

In FIG. 4 both the emitter element 3 and the receiver element 4 of a monitoring unit 27 have an input 24 and 25 respectively at which in each case a switch 10, 10' is connected up. The emitter element 3 is connected via a bus line 15 to a bus connection 16 of the receiver element, which is in turn directly connected to the reliable control system 21 via a bus line 26. The latter is in turn connected via its output 23 to the device to be monitored 5.

Advantageous in the embodiment in accordance with the invention in accordance with FIG. 4 is, on the one hand, that the reliable bus-capable input/output unit 19 can be omitted, since again the capability inherent in the monitoring unit 27 of generating a control or switch-off signal respectively for the reliable control system 21 is also used during the actuation of the switches 10, 10'.

Through the coupling of the emitter and the receiver elements 3, 4 via the bus line 15 it is possible to connect up one or more switches 10 to the emitter element 3, since when the switch 10 is actuated the corresponding switching signals are transmitted via the bus line 15 to the receiver element 4, whereupon the latter generates the required control or switch-off signals respectively at the bus connection 16. Since in the receiver element 4 all electrical connections are frequently occupied by other functions, such for example protection check, command devices, lamp outputs, switching outputs or the like, but at the emitter element 3, however, corresponding connections are mostly not occupied, it is often advantageous to use these unoccupied connections for the connection of the switch 10.

As already described in connection with FIG. 2, the inputs 24, 25 can be designed as multiple function connections and realize the same functions as were described in connection with FIG. 4. Furthermore, one or more inputs 24, 25 can likewise be provided both at the emitter element 3 and also at the receiver element 4.

What is claimed is:

1. Apparatus for the monitoring of a protection region comprising a monitoring unit for the detection of an object penetrating into the protection region, with the monitoring unit having at least one output at which a control signal for the excitation of a device to be monitored, in particular a switching signal for the switching off of the device, can be produced when an object penetrates into the protection region, and comprising at least one connection for a switch, wherein the switch comprises an emergency off switch through which the device can be excited, wherein the at least one connection is designed as input of the monitoring unit; and through actuation of a switch which is connected to the input the control signal for the device to be monitored can be generated at the output of the monitoring unit, wherein the monitoring unit is designed as a contactlessly acting monitoring unit.

2. Apparatus in accordance with claim 1, wherein the monitoring unit has a plurality of inputs to which a plurality of switches can be connected.

3. Apparatus in accordance with claim 1, wherein the monitoring unit is designed as a light grille.

4. Apparatus in accordance with claim 1, wherein the monitoring unit comprises an emitter element for the emission of an emitter signal and a receiver element which is designed for the reception of the emitter signal which is emitted by the emitter element; and the output is provided at the receiver element.

5. Apparatus in accordance with claim 4, wherein the connection is designed as inputs of the receiver element.

6. Apparatus in accordance with claim 4, wherein the connection is designed as input of the emitter element; and the emitter element is coupled to the receiver element for the transmission of control signals, wherein the transmission of control signals is via a bus line.

7. Apparatus in accordance with claim 1, wherein the output is connected via a bus line to a reliable control system with a bus connection via which the device to be monitored can be excited.

8. Apparatus in accordance with claim 1, wherein the connection is designed as a multiple function connection.

9. An apparatus in accordance with claim 1, wherein the excited device is switched off through the emergency off switch.

10. Apparatus for the monitoring of a protection region comprising a monitoring unit for the detection of an object penetrating into the protection region, with the monitoring unit having at least one output at which a control signal for the excitation of a device to be monitored, in particular a switching signal for the switching off of the device, can be produced when an object penetrates into the protection region, and comprising at least one connection for a switch, wherein the switch comprises an emergency off switch through which the device can be excited, wherein the at least one connection is designed as input of the monitoring unit; and through actuation of a switch which is connected to the input the control signal for the device to be monitored can be generated at the output of the monitoring unit, wherein the monitoring unit is designed as a mechanically responding monitoring unit for the detection of objects which penetrate into the monitoring region.

11. An apparatus in accordance with claim 10, wherein the excited device is switched off through the emergency off switch.

12. Apparatus in accordance with claim 10, wherein the monitoring unit has a plurality of inputs to which a plurality of switches can be connected.

13. Apparatus in accordance with claim 10, wherein the monitoring unit comprises an emitter element for the emission of an emitter signal and a receiver element which is designed for the reception of the emitter signal which is emitted by the emitter element; and the output is provided at the receiver element.

14. Apparatus in accordance with claim 13, wherein the connection is designed as inputs of the receiver element.

15. Apparatus in accordance with claim 13, wherein the connection is designed as input of the emitter element; and the emitter element is coupled to the receiver element for the transmission of control signals, wherein the transmission of control signals is via a bus line.

16. Apparatus in accordance with claim 10, wherein the mechanically responding monitoring unit comprises a tread mat for the detection of objects which penetrate into the monitoring region.

17. Apparatus in accordance with claim 10, wherein the output is connected via a bus line to a reliable control system with a bus connection via which the device to be monitored can be excited.

18. Apparatus in accordance with claim 10, wherein the connection is designed as a multiple function connection.

* * * * *